3,503,938
MANUFACTURE OF POLYAMIDES BY CONDENSING VAPORS OF POLYAMIDE FORMING INGREDIENTS ON A POLISHED SURFACE
Sydney Edward Blurton, Ernest Haworth, and John Norman Minford, Manchester, England, assignors to Imperial Chemical Industries Limited, London, England, a corporation of Great Britain
No Drawing. Filed Sept. 26, 1966, Ser. No. 581,737
Claims priority, application Great Britain, Sept. 28, 1965, 41,200/65
Int. Cl. C08g 20/20
U.S. Cl. 260—78                                       6 Claims

ABSTRACT OF THE DISCLOSURE

A method for manufacturing nylon wherein the polymerization of the nylon-forming ingredients is effected in a closed pressure vessel having a polished interior surface, particularly the surface above the liquid level of the polymerizing ingredients, thereby reducing the adhesion of decomposition products to the vessel walls and correspondingly reducing the frequency of cleaning said vessel. In a preferred embodiment, the interior surfaces above the liquid polymerizing level is also preferably controlled to a temperature below the heat supply regions, e.g., below the liquid level, of said vessel.

---

This invention relates to the manufacture of polymers particularly the fibre-forming linear polyamides known as nylon.

Nylon is manufactured by heating suitable intermediates in autoclaves, beneath an atmosphere of inert gas such as nitrogen. The intermediates may be either a mixture of a dicarboxylic acid, for example adipic acid, and an aliphatic diamine, for example hexamethylene diamine; or a salt of dicarboxylic acid and diamine; or alternatively a lactam, for example caprolactam. Formation of the nylon ensues from polycondensation of the intermediates with liberation of water which is allowed to escape from the reaction mixture as steam.

Despite the inert gas atmosphere some decomposition takes place during the heating and the presence of decomposition products in the final product can adversely affect the quality of fibre spun from it. For economic reasons the autoclaves are not opened up after each batch of polymer is manufactured and in consequence a deposit of solid decomposition product may be gradually built up inside the vessel during its repeated use. Stalactitic formations of such solid matter are frequently formed in this way in the upper regions of the vessel. Occasionally a portion of this solid matter may break off and fall into the nylon polymer, thus producing a batch of material which gives very inferior spun fibre.

We have now found that deposition of solid decomposition products is largely prevented by the use of autoclaves with polished interior surfaces.

According to the invention therefore we provide a process for manufacture of nylon which comprises heating nylon-forming ingredients to a temperature at which fibre-forming polymer is produced, the operation being carried out in a closed pressure vessel having a polished interior surface.

Preferably also any fittings projecting into the pressure vessel, such as thermocouple sheaths, supports or branches, are also polished.

By the term "polished" we mean that the surface has a smooth but not necessarily mirror-like finish, without any significant irregularities. The degree of smoothness of a surface may be expressed in terms of its variation from an imaginary mean central surface which is commonly called the centre line average or CLA. The polished surface of the vessel and fittings used in our invention preferably has a maximum variation of not more than 50 micro inches from centre line average. It is however desirable for the surface to be even more highly polished than this and we especially prefer a surface with a maximum variation of 30 micro inches from centre line average.

The nylon-forming ingredients may be heated at temperatures within the range 110° C. to 300° C. for periods of time ranging from 1 hour to 6 hours. The pressure in the pressure vessel may vary from substantially atmospheric pressure up to 20 atmospheres.

It is a further feature of our invention to manufacture nylon by a process as hereinbefore defined wherein for at least some of the heating period a lower zone of the interior wall of the vessel is maintained at a temperature above the temperature of the vessel contents and at the same time an upper zone of the interior wall of the vessel is maintained at a temperature below the temperature of the lower zone. Such maintenance of temperature differentials between the vessel contents and the upper and lower zones of the interior wall of the pressure vessel in the manufacture of fibre-forming linear polyamides is described in United States patent application Ser. No. 546,075.

After carrying out manufacture of a batch of nylon by the process of our invention the molten product may be removed from the autoclave by blowing it out through a discharge pipe.

By manufacturing nylon according to the process of our invention in a vessel having a polished interior surface, the rate of build of any decomposition products on the surface of the upper part of the vessel is considerably reduced. It is possible to remove the deposits of decomposition products from the interior of the autoclave by washing it with a suitable liquid without affecting the polished surface and without the necessity for opening the autoclave for mechanical cleaning as is necessary when stalactitic formations are present. A suitable liquid for washing the interior of the autoclave is acetic acid which may be diluted with water, for example to 5% strength.

The process of our invention enables us to manufacture large numbers of batches of nylon, particularly polyhexamethylene adipamide (nylon 66), successively in an autoclave without opening it for physical or mechanical cleaning.

We have found in general that in conditions conducive to the build-up of degradation products about five times as many batches of nylon may be manufactured according to the process of our invention in a vessel having a polished interior surface as in a vessel without a polished interior surface before it is necessary to remove accumulated decomposition products.

In practice we have found that, when manufacturing nylon according to the process of our invention, it is unnecessary for the autoclave to be opened for cleaning between the intervals at which it must in any event be opened for the routine mechanical inspecting and testing required for all pressure vessels. When the autoclave is opened any small amount of deposit which may adhere to the polished surfaces can be easily removed without damage to the surface so that manufacture of high quality nylon may be recommenced straight away in the cleaned autoclave. On the other hand when an ordinary unpolished autoclave is opened after a run of nylon manufacture removal of decomposition product from the surface is difficult and the autoclave cannot always be cleaned efficiently by mechanical means. In consequence, the first few batches of polymer produced after opening and mechanically cleaning out may be of an inferior quality compared with later batches obtained after the autoclave has again settled down. By cutting out this initial period during which inferior material is produced we are enabled still further to increase productivity.

Conveniently the process of the invention may be conducted in an autoclave having a polished interior surface and provided with separate heating jackets for heating the upper and lower parts, so that whilst the lower part of the vessel is being heated, heating of the upper part may be diminished or discontinued, or if this is desired omitted altogether. It is preferable to arrange that the upper heating jacket covers that part of the autoclave extending down to about the level occupied by the liquid-vapour boundary of the autoclave contents at the end of the polymerisation. Vessels with heating jackets arranged in this manner are described in United States patent application Ser. No. 546,075.

In the application of the process of the invention to the manufacture of polyhexamethylene adipamide a convenient way of proceeding is to charge an aqueous solution of hexamethylenediammonium adipate to a vessel having a polished interior surface and provided with two or more separate heating jackets for supplying heat to different zones of the interior wall of the vessel. The vessel is closed and the solution is heated until the pressure reaches a value from 190–260 p.s.i.g. Heating of the solution is effected by supplying heat to the lower zone of the interior wall of the vessel which is in contact with the solution by passing heating fluid through the heating jacket or jackets adjacent to the lower zone and also if desired by supplying heat to the upper zone of the interior wall of the vessel by passing heating fluid through the jacket or jackets adjacent to the upper zone. During this stage water present originally in the solution and that formed in the reaction is allowed to escape by bleeding off as steam. When, however, a substantial proportion of the water originally present, or formed in the reaction has been removed from the vessel so that the liquid contents of the vessel are substantially reduced in volume, and the level of the liquid contents has fallen, which stage corresponds with a temperature of the vessel contents within the range of 230°–270° C., the temperature of the upper zone of the vessel, that is that part of the vessel above the liquid contents and in contact with vapour, is reduced below that of the lower zone, if it is not already below it, by discontinuing or reducing the supply of heat to the upper zone while continuing to supply heat to the lower zone. Heating of the liquid contents is continued as necessary by applying heat to the lower zone until the polycondensation reaction is completed, the pressure being finally reduced to that of the atmosphere. The contents of the vessel are then discharged. When working under these conditions the interior of the vessel remains clean and free from deposits of decomposition products of the reaction mixture even after repeated use. The concentration of the aqueous solution of hexamethylenediammonium adipate originally charged to the autoclave may vary, for example between 45% and 95%.

The invention is illustrated but not limited by the following example:

EXAMPLE

An 80% by weight solution of hexamethylenediammonium adipate is charged into an autoclave whose interior walls and fittings are polished to a degree of smoothness having a maximum variation of 50 micro inches from centre line average. Heating is applied to the autoclave and the pressure raised to 190–260 p.s.i.g. This pressure is maintained whilst bleeding off steam. When the internal temperature reaches 230–270° C. the pressure is reduced to atmospheric pressure and heating is continued or discontinued as required to maintain the correct temperature of the autoclave contents until the polymer is discharged.

After reaching atmospheric pressure the polymer (polyhexamethylene adipamide) is held in the autoclave for a further 20–40 minutes and then discharged under nitrogen pressure. The whole operation is repeated about 3000 to 4000 times without opening the autoclave for cleaning, each batch of polymer being of good quality.

We claim:

1. A process for the manufacture of fiber forming polyamide which comprises heating polyamide-forming ingredients to form a liquid melt at a temperature of 110 to 300° C. and a pressure of from substantially atmospheric up to 20 atmospheres, vaporizing at least a portion of said ingredients during said heating, contacting said vaporized portion with a polished surface having a maximum variation of 30 micro inches from center line average, condensing at least some of said vapors on said polished surface and returning the condensate to the melt.

2. The process of claim 1 wherein for at least a portion of the heating period the heat applied to the liquid melt is greater than the heat applied to the polished surface.

3. The process of claim 1 in which the polyamide is polyhexamethylene adipamide.

4. A process according to claim 1 for the manufacture of polyhexamethylene adipamide by polycondensation of hexamethylenediammonium adipate which comprises charging an aqueous solution of hexamethylenediammonium adipate to a presure zone provided with two or more separate heating zones for supplying heat to different areas of said pressure zone, heating said solution by supplying heat to at least that lower portion of said pressure zone which is in contact with said solution until the pressure reaches a value within the range 190–260 p.s.i.g., allowing water to escape as steam until the liquid contents are substantially reduced in volume and have a temperature within the range 230°–270° C., then regulating the temperature of that upper portion of said pressure zone which is in contact with vapour and comprises said polished surface to below that of said lower portion in contact with liquid by discontinuing or reducing any supply of heat to that upper zone so that its temperature falls below that of the said lower zone while continuing to supply heat to the said lower zone, completing the polycondensation by further heating the liquid contents as necessary by supplying heat to the said lower zone, while reducing the pressure to that of the atmosphere, and discharging the liquid contents from the vessel.

5. The process of claim 4 in which the contents of the pressure vessel are heated initially by supplying heat to both the upper and lower portions thereof.

6. The process of claim 4 in which the contents of the pressure zone are heated by supplying heat to the lower portion thereof only.

References Cited

UNITED STATES PATENTS

| | | | |
|---|---|---|---|
| 2,130,948 | 9/1938 | Carothers | 260—78 |
| 2,163,584 | 6/1939 | Carothers et al. | 260—78 |
| 2,163,636 | 6/1939 | Spanagel | 260—78 |
| 2,165,253 | 7/1939 | Graves | 260—78 |
| 2,190,770 | 2/1940 | Carothers | 260—78 |
| 2,562,796 | 7/1951 | Koch | 260—78 |
| 2,918,454 | 12/1959 | Graham | 260—78 |
| 3,027,355 | 3/1962 | Taul et al. | 260—78 |
| 3,294,757 | 12/1966 | Church | 260—78 |
| 3,296,217 | 1/1967 | Tate | 260—78 |

HAROLD D. ANDERSON, Primary Examiner

U.S. Cl. X.R.

260—78, 95